United States Patent
Barnes et al.

(10) Patent No.: US 8,473,264 B2
(45) Date of Patent: Jun. 25, 2013

(54) GEOPHYSICAL DATA PROCESSING SYSTEMS

(75) Inventors: Gary James Barnes, Cambridge (GB); John Morris Lumley, Cambridge (GB); Mark Davies, Cambridge (GB); Joseph Jean Barraud, Huntingdon (GB)

(73) Assignee: Arkex Limited, Cambridge (GB)

( * ) Notice: Subject to any disclaimer, the term of this patent is extended or adjusted under 35 U.S.C. 154(b) by 253 days.

(21) Appl. No.: 12/863,754

(22) PCT Filed: Jan. 21, 2008

(86) PCT No.: PCT/GB2008/050041
§ 371 (c)(1),
(2), (4) Date: Jul. 20, 2010

(87) PCT Pub. No.: WO2009/092992
PCT Pub. Date: Jul. 30, 2009

(65) Prior Publication Data
US 2010/0292973 A1 Nov. 18, 2010

(51) Int. Cl.
*G06F 17/10* (2006.01)

(52) U.S. Cl.
USPC .......... 703/2; 703/6; 703/10; 702/16; 702/14; 702/7; 702/18; 702/17

(58) Field of Classification Search
USPC .......... 702/2, 14; 703/10, 2; 324/377
See application file for complete search history.

(56) References Cited

U.S. PATENT DOCUMENTS

| | | | |
|---|---|---|---|
| 7,356,411 B1 * | 4/2008 | Stoyer et al. | 702/2 |
| 2003/0060981 A1 * | 3/2003 | Routh et al. | 702/14 |
| 2004/0260471 A1 | 12/2004 | McDermott | |
| 2005/0197773 A1 * | 9/2005 | Brewster et al. | 702/2 |
| 2006/0036367 A1 * | 2/2006 | Brewster | 702/14 |
| 2006/0074562 A1 * | 4/2006 | Amundsen et al. | 702/18 |
| 2007/0219765 A1 * | 9/2007 | Calvert et al. | 703/6 |

OTHER PUBLICATIONS

Li, Yaoguo et al.; Separation of regional and residual magnetic field data; Geophysics, Mar.-Apr. 1998, Soc. Exploration Geophysicists, USA; XP-002497541; 1 page.
Portniaguine, O. et al.; Focusing geophysical inversion images; Geophysics, May-Jun. 1999, Soc. Exploration Geophysicists, USA; XP-002497542; 1 page.
Yaoguo Li, et al.; Separation of regional and residual magnetic field data; Database Inspec, The Institution of Electrical Engineers, Stevenage, GB; Soc. Exploration Geophysicists, vol. 63 No. 2, Mar. 1998; 1 page.
Portniaguine O, et al.; Focusing geophysical inversion images; The Institute of Electrical Engineers, Stevenage, GB; Soc. Exploration Geophysicists; vol. 64, No. 3; May 1999; 1 page.
PCT International Search Report on application No. PCT/GB2008/050041 dated Oct. 15, 2008; 3 pages.
Blakely, R. J., Potential Theory in Gravity and Magnetic Applications, Cambridge University Press, 1995, p. 185.

* cited by examiner

*Primary Examiner* — Saif Alhija
*Assistant Examiner* — Cuong Luu
(74) *Attorney, Agent, or Firm* — Foley & Lardner LLP

(57) ABSTRACT

A method of processing geophysical data including at least measured potential field data from a potential field survey of a surveyed region of the earth to provide a representation of the geology of said surveyed region, the method comprising generating a first model of said surveyed region by fitting data predicted by said first model to said measured data for a specified frequency range; predicting full range potential field data for all measured frequencies using said generated first model; comparing said full range predicted data to said measured potential field data to provide full range residual data representing a difference between the full range predicted data and the full range measured data, and interpreting said full range residual data to provide a representation of said geology of said surveyed region.

10 Claims, 7 Drawing Sheets

GEOPHYSICAL DATA PROCESSING SYSTEMS

CROSS-REFERENCE TO RELATED PATENT APPLICATIONS

PCT Application PCT/GB2008/050041 filed Jan. 21, 2008 including the specification, drawings, claims and abstract, is incorporated herein by reference in its entirety.

FIELD OF THE INVENTION

This invention relates to methods, apparatus, and computer program code for processing geophysical data, more particularly gravity gradiometer data from a potential field survey to provide a representation of the underlying geology of the surveyed region. Embodiments of the techniques we describe are particularly useful for processing data from airborne surveys, in particular gravity field surveys.

BACKGROUND TO THE INVENTION

A potential field survey is performed by measuring potential field data which, for a gravity survey, may comprise one or more of gravimeter data (measuring gravity field) or gravity gradiometer data (measuring gravity field gradient), vector magnetometer data, true magnetic gradiometer data, and other types of data well-known to those skilled in the art. A common aim of a geophysical potential field survey is to search for signatures which potentially indicate valuable mineral deposits.

The goal of most potential field surveys is to deduce the sub-surface geology. It is well known to the geophysics industry that the high spatial frequency potential field signals are dominated by near surface anomalies. Further, in most situations, the terrain and the near surface geology also give rise to substantial low spatial frequency signals. In general, the low frequency signals from the near surface anomalies are extremely hard to distinguish from the low frequency signals coming from deeper geology. Accordingly, it is possible to postulate a geology having only a near surface mass distribution which matches the measured signal implying that there are no anomalies left in the measured signal coming from deep geologies. Fortunately most such mass distributions can be ruled out using a range of tools including geological knowledge, known typical density distributions, prior information, similar known structures elsewhere in the world etc.

There remains a need, however, for improved techniques for processing geophysical data from such surveys in order to identify the underlying geology.

SUMMARY OF THE INVENTION

According to a first aspect of the invention there is therefore provided a method of processing geophysical data including at least measured potential field data from a potential field survey of a surveyed region of the earth to provide a representation of the geology of said surveyed region, the method comprising:
  generating a first model of said surveyed region by fitting data predicted by said first model to said measured data for a specified frequency range;
  predicting full range potential field data for all measured frequencies using said generated first model;
  comparing said full range predicted data to said measured potential field data to provide full range residual data representing a difference between the full range predicted data and the full range measured data, and
  interpreting said full range residual data to provide a representation of said geology of said surveyed region.

In general, the goal when processing geophysical data is to try and find structure below near surface geology. Accordingly, an Earth Model at least down to and including the depth of interest needs to be generated. The signals from shallow structures are relatively larger than those from the deeper sources, thus it is particularly important to be able to construct a good Shallow Earth Model (SEM). A SEM usually consists of either or both of two elements, the topography (which can be assumed to be known to a high accuracy) and the depth to bedrock (which can only be inferred). The depth of an SEM depends on the geology of the surveyed region and may be a few hundred meters to several kilometers. The SEM may be in the range of 100 m to 1 km.

The high spatial frequencies of potential field data are dominated by the near surface sources, whereas the low frequency signals are generated by both the shallow and deep sources. The low frequency signals are thus not unique to the near surface features. Accordingly, the method preferably comprises generating said first model for high frequencies wherein said first model may be a shallow earth model. The specified frequency range depends on the nature of the surveyed region and may be determined by the parameters of the first model. For example, if the first model is a SEM and the SEM has a depth of approximately 1 km, the specified high frequency range represents frequencies having a wavelength of less than 1 km.

Said first model may be generated by comparing the data predicted by said first model and the measured data to provide initial residual data, filtering said initial residual data by frequency and minimising said filtered initial residual data. Fitting parameters (e.g. density) of the first model to the high frequency data will provide a more accurate shallow earth model (SEM) which is not contaminated by any low frequency signals. The idea of fitting parameters to a pre-defined bandwidth of a given data set is known as a focused inversion. If the method attempted to fit the SEM to the full bandwidth of the signal, the SEM parameters would be of inferior quality due to their attempt to represent the low frequency content in the signal that originates from deeper sources.

According to another aspect of the invention there is provided a method of processing geophysical data including at least measured potential field data from a potential field survey of a surveyed region of the earth to provide a representation of the geology of said surveyed region, the method comprising:
  generating a first model of said geology using a focussed inversion;
  predicting full range potential field data using said generated first model;
  comparing said full range predicted data to said measured potential field data to provide full range residual data representing a difference between the predicted data and the measured data, and
  interpreting said full range residual data to provide a representation of said geology of said surveyed region.

For both aspects, said full range residual data may be interpreted using standard techniques. For example, the interpreting step may comprise generating a second model of said geology by fitting data predicted by said second model to said full range residual data, and generating a representation of said geology of said surveyed region using said second model. Alternatively, a full second model may not be constructed and said full range residual data may be interpreted to identify key geological features.

Said second model may be calculated by minimising the differences between the full range residual data and data predicted by the model given a set of parameters, e.g. by using well known fit measures such as least squares. Where the first model is a shallow earth model, the second model may be a model of the deeper or underlying geology of the surveyed region.

For both the first and second models, if the geology being modelled consists of regions of unknown but constant densities, the model parameters are these densities. The prediction function pred(x) may be stated in matrix form as $$\text{pred}(x)=Ax$$

where A is a matrix of constant numerical values and x is the set of densities.

In both aspects, the potential field data preferably comprises gravity gradiometer data, particularly for deriving the SEM. In its simplest form a gradiometer is two accelerometers separated by some distance. There will be a very small change in gravity between the two sensors and it is these differences which are measured by all gravity gradiometers. However, the initial accelerations that contaminate conventional gravity are common to both sensors and are therefore not seen for a properly balanced gravity gradiometer. This fundamental characteristic means that gravity gradiometry is the ideal choice for high dynamic environments and allows for a much higher bandwidth measurement to be recorded.

Gradiometry has superior performance over almost all frequencies usually encountered in a geophysical survey and most particularly at higher frequencies (e.g. for wavelengths less that approximately 20000 meters). Accordingly, gradiometry is particularly useful for deriving a SEM.

With current technology, the crossover at which other measurement systems perform as well as, or better than, gradiometry appears to be at 23 km wavelength. Beyond 34 km wavelength a gravity gradiometer still recovers long wavelength signals, albeit at a reduced accuracy compared with conventional gravity. At these longer wavelengths it is difficult to quantify the smallest signal present in a gradiometer survey. Nevertheless, it is possible to derive a model for the sub-surface geology using gradiometry, although other potential field data may be used to derive this model.

According to another aspect of the invention, there is provided a method of processing geophysical data including at least measured gravity gradiometer data from a potential field survey of a surveyed region of the earth to provide a representation of the underlying geology of said surveyed region, the method comprising:

processing said gravity gradiometer data to generate a shallow earth model, removing data predicted by said shallow earth model from said measured gravity gradiometer data to leave residual data;

processing said residual data to generate a model of sub-surface geology, and generating a representation of said underlying geology of said surveyed region using at least one of said models.

The method may further comprise generating the shallow earth model by fitting data predicted by said shallow earth model to said measured data for high frequencies. The data predicted by said shallow earth model may comprise predicted data across the whole bandwidth of the measured data. As explained above, this ensures that the SEM is an improvement over known SEMs.

In each aspect, the method may comprise performing terrain correction by subtracting-off particularly the higher frequencies (which dominate the power spectrum). A signal with wavelength $\lambda$ falls off with height z as $\exp(-kz)$ where $k=2\pi/\lambda$ (from which it can be seen that longer wavelengths are less attenuated) and the wavelength scale corresponds to a signature expected given a target's size and depth. This technique is described in more detail in the applicant's pending UK patent application GB0715031.1 which is incorporated by reference in its entirety.

In embodiments, in particular where the field comprises a gravity field, the processing to generate a model comprises identifying spatial features by identifying one or more of maxima, minima and points/lines of inflection in the filtered or residual potential field data. Thus, for example, with the gravity gradient tensor the on-diagonal components $G_{xx}$, $G_{yy}$, and $G_{zz}$, (which are differential signals) are processed to determine inflection points or changes in slope since these generally correspond to geologically significant features of the surveyed region such as an interface between two different types/densities of rock. For off-diagonal components, in particular $G_{zx}$ and $G_{zy}$ (which emphasise symmetries in the x- and y-direction respectively, maxima and/or minima are preferably identified; for $G_{xy}$, points are preferably identified by locating pairs of dipoles since these tend to identify corners of a subterranean body. Off-diagonal elements $G_{zi}$ (where i is x or y) tend to emphasise symmetries in the i-direction. On-diagonal components $G_{xx}$ and $G_{yy}$ are always zero along respective axis x and y of the source and since the choice of axis is often arbitrary, optionally the co-ordinates system may be rotated about one or more axis to potentially identify further geologically useful information. In embodiments the co-ordinate axis may be selected to maximise the apparent useful geological information. Similarly magnetic data may be processed to identify maximum/minimum inflection points/lines.

Referring again to the above-mentioned maxima, minima and lines of inflection, multiple sets of spatial features may be identified for the filtered or residual potential field data, for example from different vector or tensor components of a surveyed gravity field, magnetic field or gravity gradient field and/or from survey data other than from a potential field survey. Other survey data which may be combined with the data obtained from a potential field survey includes (but is not limited to): topographic information, for example determined by lidar, spectral or more preferably hyperspectral imagery, gas saturation data, chemical analysis data (from soil sampling), and other soil survey data.

In preferred embodiments the potential field survey is conducted from a moving platform such as an aircraft.

The method may further comprise generating fault polygon data from the 3D representation of the underlying geology of the surveyed region. As the skilled person will understand, fault polygon data comprises data representing a location of one or more geological faults on a surface or horizon of the surveyed region. Such a fault polygon may be defined by a plurality of corner points and/or edges, in particular defining a loop, for example on the earth's surface. Such a fault polygon may thus define horizons of stratigraphic layers. Fault polygons are useful because it is generally undesirable to drill at the location of a fault because typically the geology changes to either side of a fault and thus by drilling through the fault one may miss the desired oil or mineral.

The invention also provides a method of prospecting for oil or a mineral from the earth, the method including conducting a potential field survey according to an aspect or embodiment of the invention as described above to generate a representation of the underlying geology of the surveyed region, and then using this representation to locate the desired oil or mineral. A further aspect of the invention also provides oil or mineral extracted using this technique.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another, for example distributed across a network.

The invention further provides a data processing system configured to implement embodiments of the above-described methods, to determine one or more parameters relating to physical properties of the Earth's interior from processed geophysical data. Such a data processing system may comprise: data memory for storing measured potential field data and plot data for representing the underlying geology of the surveyed region, program memory storing processor control code as described above; and a processor coupled to said data memory and to said program memory to load and implement said control code.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Potential Field Surveys

Figure 1:
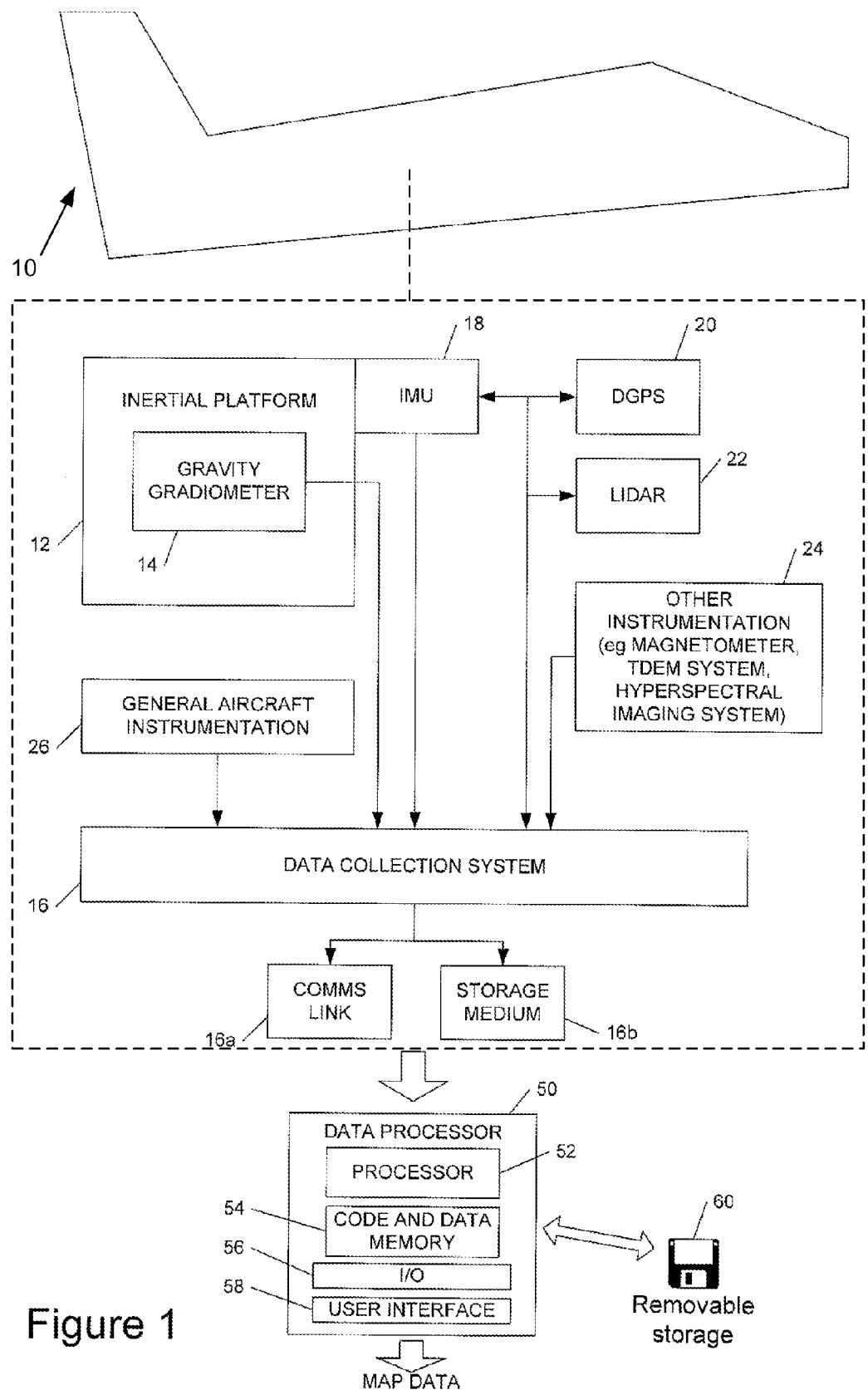
FIG. 1 shows an aircraft with flight survey data, and an example of a data processing system configured to implement an embodiment of a method according to the invention.

When we refer to a field, in particular a gravity field, this is not limited to a vector field but includes scalar and tensor fields, a potential field and any derivatives deriving from the potential field. Potential field data includes, but is not limited to, gravimeter data, gravity gradiometer data, vector magnetometer data and true magnetic gradiometer data. Elements and representations of a potential field may be derived from a scalar quantity.

Consider an airborne potential field survey such as a gravity survey, flown on a grid pattern defined by orthogonal sets of parallel lines (flight paths) on a two-dimensional surface which is draped over the underlying terrain. When looking for underlying anomalies the nearby mass has a dominating effect and to provide an accurate representation of deep features a good representation of surface features is desirable so as to be able to perform terrain correction by subtracting-off particularly the higher frequencies (which dominate the power spectrum). A signal with wavelength $\lambda$ falls off with height z as $\exp(-kz)$ where $k=2\pi/\lambda$ (from which it can be seen that longer wavelengths are less attenuated) and the wavelength scale corresponds to a signature expected given a target's size and depth.

For gravity, the relevant potential is the gravity scalar potential, $\Phi(r)$, defined as $$\Phi(r) = \int\int\int \frac{G\rho(r')}{|r-r'|} d^3 r'$$

where r, $\rho(r')$, G are respectively, the position of measurement of the gravity field, the mass density at location r', and the gravitational constant. The gravitational acceleration, which is how a gravitational field is experienced, is the spatial derivative of the scalar potential. Gravity is a vector in that it has directionality. It is represented by three components with respect to any chosen Cartesian coordinate system as:

$$g = (g_x, g_y, g_z) = \left(\frac{\partial \Phi(r)}{\partial x}, \frac{\partial \Phi(r)}{\partial y}, \frac{\partial \Phi(r)}{\partial z}\right)$$

Each of these three components varies in each of the three directions and the nine quantities so generated form the Gravity gradient tensor:

$$G = \begin{pmatrix} G_{xx} & G_{xy} & G_{xz} \\ G_{yx} & G_{yy} & G_{yz} \\ G_{zx} & G_{zy} & G_{zz} \end{pmatrix} = \begin{pmatrix} \frac{\partial}{\partial x}\frac{\partial \Phi(r)}{\partial x} & \frac{\partial}{\partial x}\frac{\partial \Phi(r)}{\partial y} & \frac{\partial}{\partial x}\frac{\partial \Phi(r)}{\partial z} \\ \frac{\partial}{\partial y}\frac{\partial \Phi(r)}{\partial x} & \frac{\partial}{\partial y}\frac{\partial \Phi(r)}{\partial y} & \frac{\partial}{\partial y}\frac{\partial \Phi(r)}{\partial z} \\ \frac{\partial}{\partial z}\frac{\partial \Phi(r)}{\partial x} & \frac{\partial}{\partial z}\frac{\partial \Phi(r)}{\partial y} & \frac{\partial}{\partial z}\frac{\partial \Phi(r)}{\partial z} \end{pmatrix}$$

Although there appear to be nine components of the gravity gradient tensor, there are only five independent components. Firstly, the tensor is symmetric as the order of differentiation of a scalar quantity does not matter (implying that $G_{xy}=G_{yx}$). Secondly, the sum of the diagonal terms equals zero (Laplace's equation). The ability to measure five spatially independent gravity components has obvious advantages over conventional gravity measurements, which only recovers the vertical component ($G_z$)

There is a relationship between the depth (and shape) of a buried object and the wavelength (and amplitude) of the detected signal. In general, a measured quantity—say a component of the gravity vector or of the gravity gradient tensor will be a summation of the form shown below. Here we use gg as notation for the measured quantity, for example $G_{zz}$.

$$gg_{calculated}(r_{measure}) = \sum_{all\text{-}masses} m_{mass\text{-}element} F(r_{measure} - r_{mass\text{-}element})$$

In the above equation F is called a Greens function (see for example, R. J. Blakely, "Potential Theory in Gravity and Magnetic Applications", Cambridge University Press, 1995, at page 185, incorporated by reference) and $r_{mass\text{-}element}$ defines the location of the mass element (for example the centre of gravity or some other defined point).

The functions F are standard functions, essentially, the influence a source (mass element) of unity mass or density and defined shape would have at the relevant (measurement) point. The source may be a point source, sphere or ellipsoid but, in practice is more often a prism, which may be irregular. For example, if the presence of a particular geological layer or, say, geological anomaly, e.g. a kimberlite pipe, is suspected a shape can be defined to take account of this. A number of textbooks list Greens functions for simple shapes; functions for more complex source geometries can be found in the literature. Also the source influence superposes so that if a complex shape can be discretised into a plurality of simpler shapes then the Greens functions for the discrete shapes can be added together. This in principle allows numerical values for the Greens function of any arbitrary shape to be determined, although in practice relatively simple shapes are generally preferable. By way of example, the Green's function F for a rectangular prism (Blakely, ibid, at page 187), has 8 terms each of which corresponds to a vertex of the prism.

Referring now to FIG. 1, this shows an example of an aircraft 10 for conducting a potential field survey to obtain data for processing in accordance with a method as described above. The aircraft 10 comprises an inertial platform 12 on which is mounted a gravity gradiometer 14 which provides potential field survey data to a data collection system 16. The inertial platform 14 is fitted with an inertial measurement unit (IMU) 18 which also provides data to data collection system 16 typically comprising attitude data (for example, pitch, roll and yaw data), angular rate and angular acceleration data, and aircraft acceleration data. The aircraft is also equipped with a differential GPS system 20 and a LIDAR system 22 or similar to provide data on the height of the aircraft above the underlying terrain. The aircraft 10 may also be equipped with other instrumentation 24 such as a magnetometer, TDEM system and/or hyperspectral imaging system, again feeding into the data collection system. The data collection system 16 also has an input from general aircraft instrumentation 26 which may comprise, for example, an altimeter, air and/or ground speed data and the like. The data collection system 16 may provide some initial data pre-processing, for example to correct the LIDAR data for aircraft motion and/or to combine data from the IMU 18 and DGPS 20. The data collection system 16 may be provided with a communications link 16a and/or non-volatile storage lob to enable the collected potential field and position data to be stored for later processing. A network interface (not shown) may also be provided.

Data processing to generate map data for the potential field survey is generally (but not necessarily) carried out offline, sometimes in a different country to that where the survey data was collected. As illustrated a data processing system 50 comprises a processor 52 coupled to code and data memory 54, an input/output system 56 (for example comprising interfaces for a network and/or storage media and/or other communications), and to a user interface 58 for example comprising a keyboard and/or mouse. The code and/or data stored in memory 54 may be provided on a removable storage medium 60. In operation the data includes data collected from the potential field survey and the code comprises code to process this data to generate map data, for example in accordance with the procedure shown in FIG. 2, described below.

Figure 2:
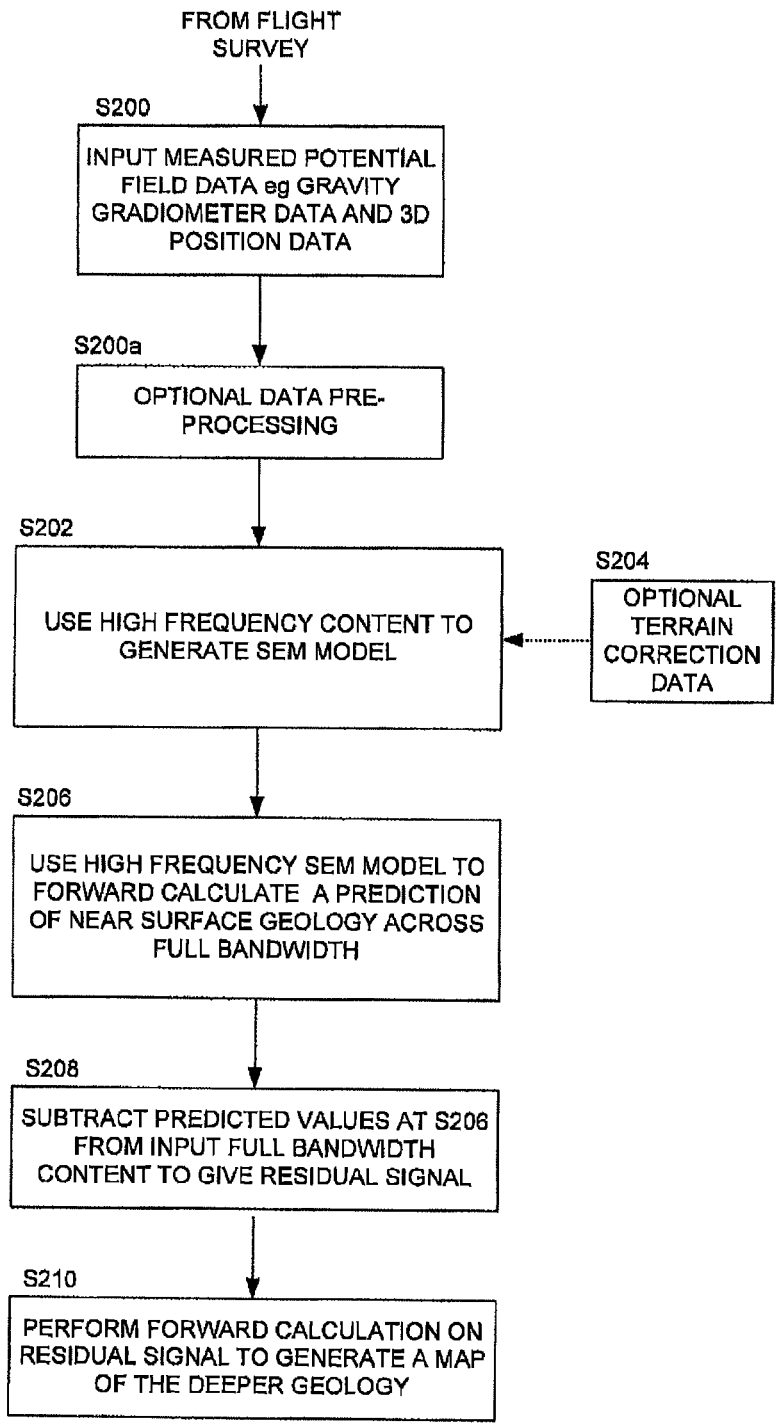
FIG. 2 shows a flow diagram of a procedure for processing measured potential field data to implement an embodiment of a method according to the invention.

Referring now to FIG. 2 this shows an example of a procedure for implementing on a data processor which may, in embodiments, comprise a general purpose computer system, for processing data from a flight survey in accordance with the previously described techniques. Thus, at step S200 the procedure inputs the measured potential field data, for example gravity gradiometer, and associated 3D position data. Optionally at step S200a, some pre-processing may be applied, for example to remove anomalies and/or to decrease (or increase) or select the data to be processed.

At step S202 the procedure fits a model to the high frequency content. Because the high spatial frequencies of the signal are dominated by the near surface sources, fitting parameters (e.g. densities) of a model to these frequencies will provide for a shallow earth model (SEM). The idea of fitting parameters to a pre-defined bandwidth of a given data set is known as a focused inversion and is achieved by applying:

$$\min\{L[\text{Filter}(\text{pred}(x)-m)]\}$$

where Filter is a spatial filter tailored to remove frequencies outside the range of interest, i.e. low frequencies in this example, L is a fit measure (e.g. standard least squares $L_2$ norm), pred(x) are the predicted signals from the model given the set of parameters x, and m represents the set of measurements.

Standard algorithmic methods can be applied to adjust the model parameters x in such a way to achieve the minimum. The solution x will be that which fits the high frequencies in the measurements m and is thus a more accurate solution for the near-surface geology.

Optionally terrain correction data may be included in the SEM as indicated at stage (S204).

After solving for the unknown model parameters in a focused inversion, at the next stage (S206), the entire bandwidth of the signal due to the model is calculated and then removed from the measurements at step S208 by applying, $$\text{residual}=m-\text{pred}(x)$$

The residual signal represents only the signals from the deeper sources and becomes the preferred data set for interpreting the deeper unknown geology. Thus at step 210, a model for the sub-surface geology may be generated, e.g. by applying the standard method of minimising the residual of the model predictions to the measurements, for example by solving $$\min\{L[\text{pred}(y)-\text{residual}]\},$$

where L is a fit measure (e.g. standard least squares $L_2$ norm), pred(y) are the predicted signals from the model given the set of parameters y, and residual represents the residual set of measurements after the predicted signal from the SEM is subtracted.

A forward calculation can be performed using these parameters to generate a desired map of the potential field for the sub-surface geology.

In both prediction steps 202 and 210, it may be possible to simplify the calculation of the model. For example, if the near surface area to be modelled consists of regions of unknown but constant densities, the model parameters x are these densities. In this case, the inversion simplifies to a linear case where the prediction function pred(x) can be stated in matrix form as $$\text{pred}(x) = Ax$$

where A is a matrix of constant numerical values.

Such a formulation would be useful in determining the unknown densities in a terrain model since the geometry of the model is often accurately known from lidar surveys.

For sub-surface geological models, the geometry can be inferred from other sources; well data, seismic surveys, etc. Accordingly, the model parameters y may be unknown but constant densities as for the near surface model.

Figure 3:
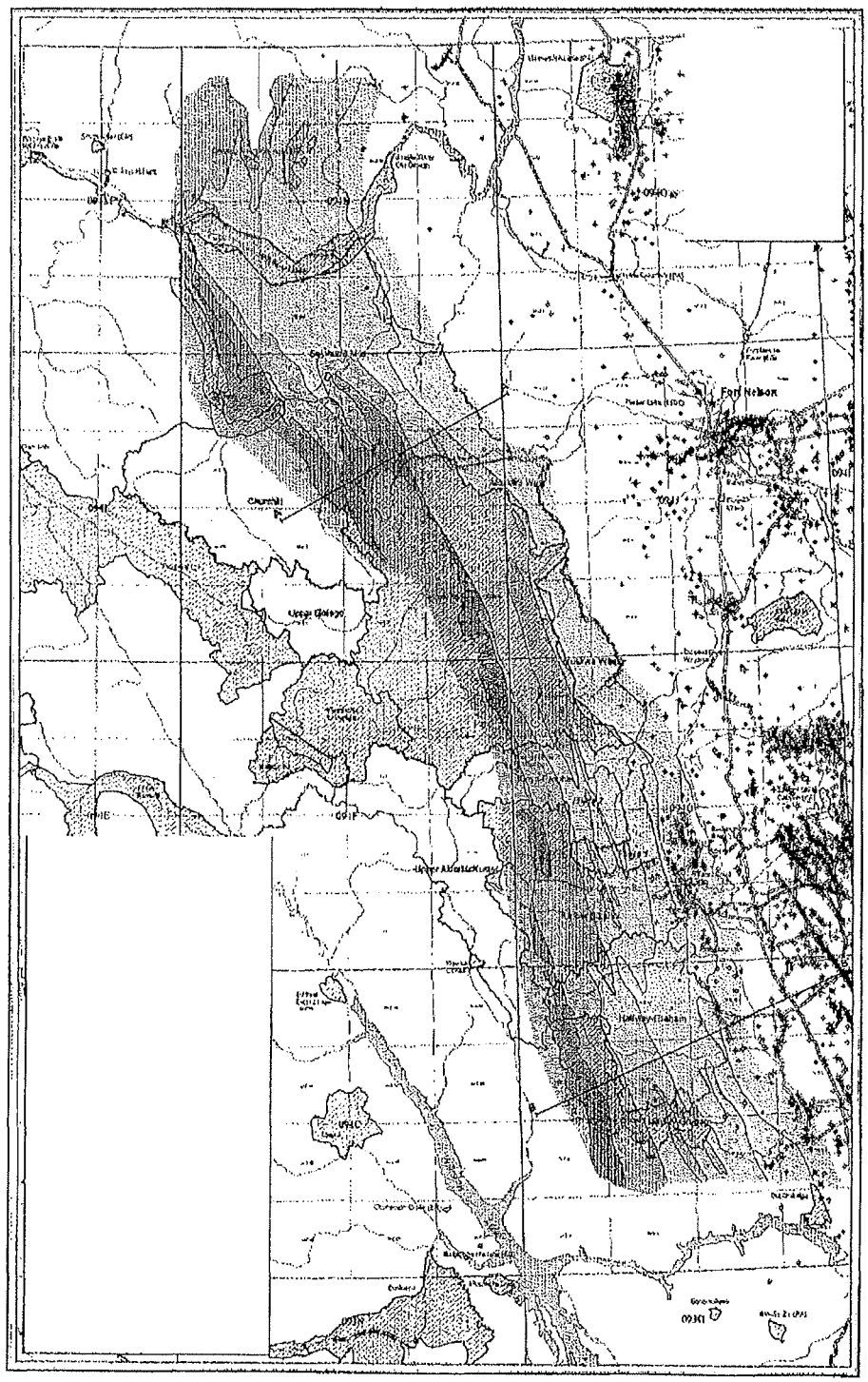
FIG. 3 is a map of the simplified geology of an area being surveyed.

FIG. 3 shows a geological map of an area being surveyed. The thickest and most stratigraphically complete part of the carbonate/clastics sequence occurs in the west of the region. FIG. 3 shows well data indicating oil and gas. High exploration within the eastern margin is evidenced by the density of well data. There is a sharp western boundary to the loci of well data plotted with only a few wells drilled west of this margin. This locality corresponds to the eastern limit of cordilleran deformation and an increase in topographic relief.

Figures 4, 5:
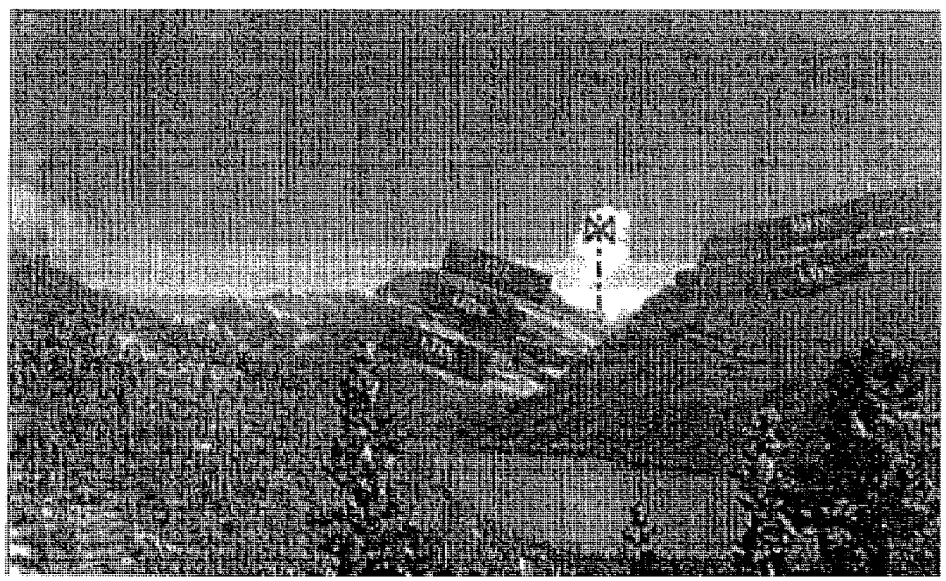
FIG. 4 is a photograph of an example of terrain encountered when conducting a survey.
FIG. 5 shows the densities and stratigraphy for the area of FIG. 3.

FIG. 4 is a photograph of the terrain encountered in this region which shows the outcropping geology. Crt is the Cretaceous clastics, Utrs the Upper Triassic Carbonates and LTrs the Lower Triassic Carbonates. Clearly the terrain is mountainous and thus represents a difficult challenge for many traditional processing methods. With various lithologies outcropping at the surface (including high density carbonates), a simple tri-model density distribution would not correct across all the area sufficiently and a detailed shallow earth model is required to take into account all the variations.

A gradiometer measures the rate of change of density within the Earth's subsurface and the key density interfaces giving rise to the gradient signal in the area are the Cretaceous, Upper Triassic and Lower Triassic units. Although there may be subtle variations within these lithologies, the system effectively measures the aggregate density of each layer. FIG. 5 shows the strata and associated densities for the area. The main exploration target for the area is the Debolt level Mississipian carbonates at a depth of 2 km subsea plus 1.5 km of terrain. In order to image the Carboniferous Debolt level structures, the SEM would have to accurately model all of the upper strata down to a detachment surface within the PermoTriassic elastics. Thus, for this example, an SEM is 3.5 km thick whereas in other geologies, an SEM may only be a few hundred or even a few tens of meters thick.

In order to build a high resolution SEM, an accurate representation of the terrain is necessary. A detailed digital terrain model (DTM) is first generated using LiDAR data. The next stage is to obtain the surface geology map to determine the outcropping units and map them onto the DTM. In certain areas, the surface geology maps were found to be inaccurate and magnetic gradiometry data is used to remap the carbonate contacts since slightly ferrous units above and below the carbonates produce a weak magnetic signal at surface outcrop.

Figure 6:
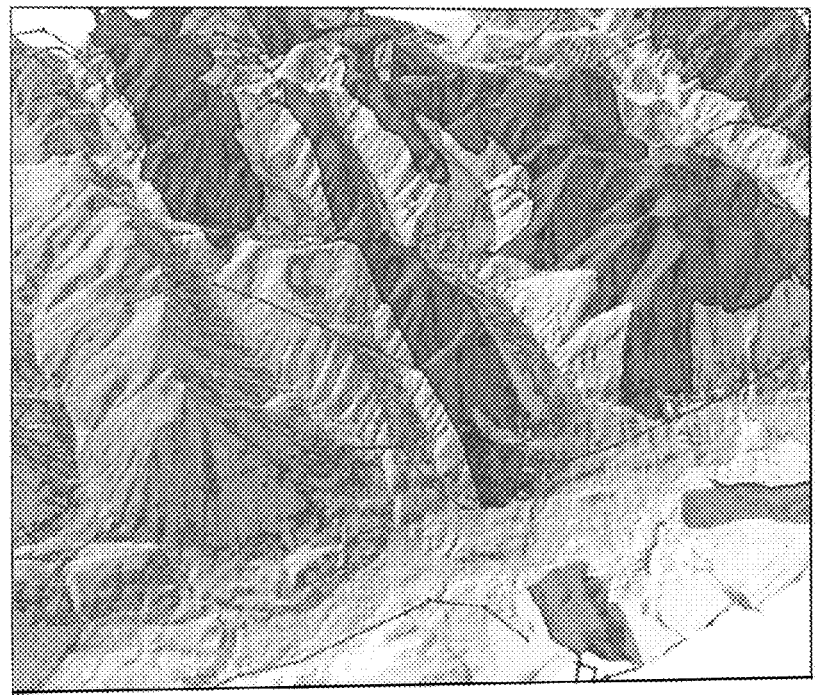
FIG. 6 is a map of the surface geology of the area of FIG. 3, the map created according to the invention.
Figure 7:
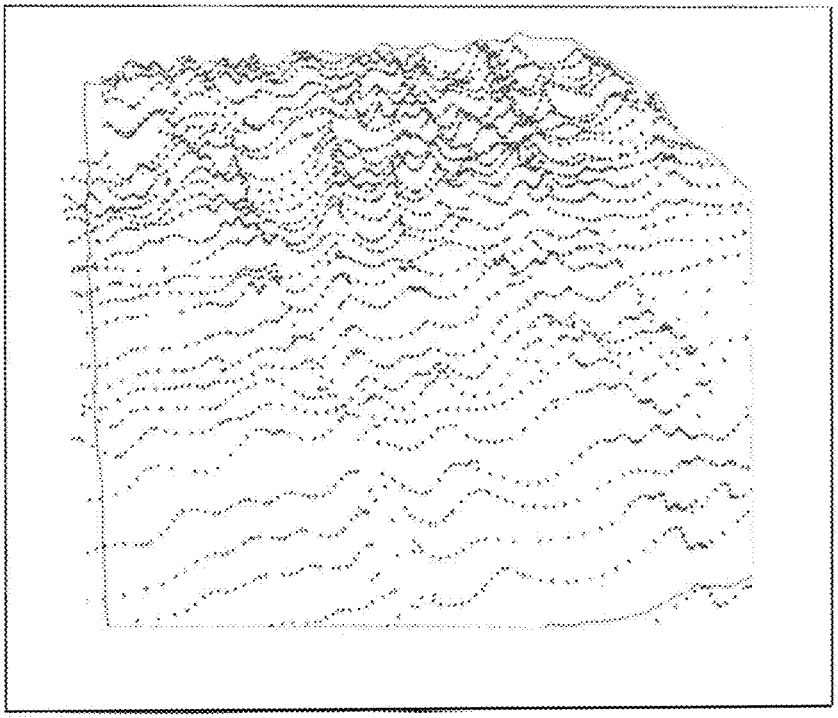
FIG. 7 is an example of an interface depth constraint added to the model used to create the map shown in FIG. 6.

The resultant surface does not take into account the depth extent of the various layers and the map is enhanced by building thirty geological cross-sections for each key interface spanning across the entire survey area, e.g. as shown in FIG. 7. The resultant cross-sections provide a series of depth constraints for each interface which are integrated into the newly mapped DTM as shown in FIG. 6.

Figure 8:
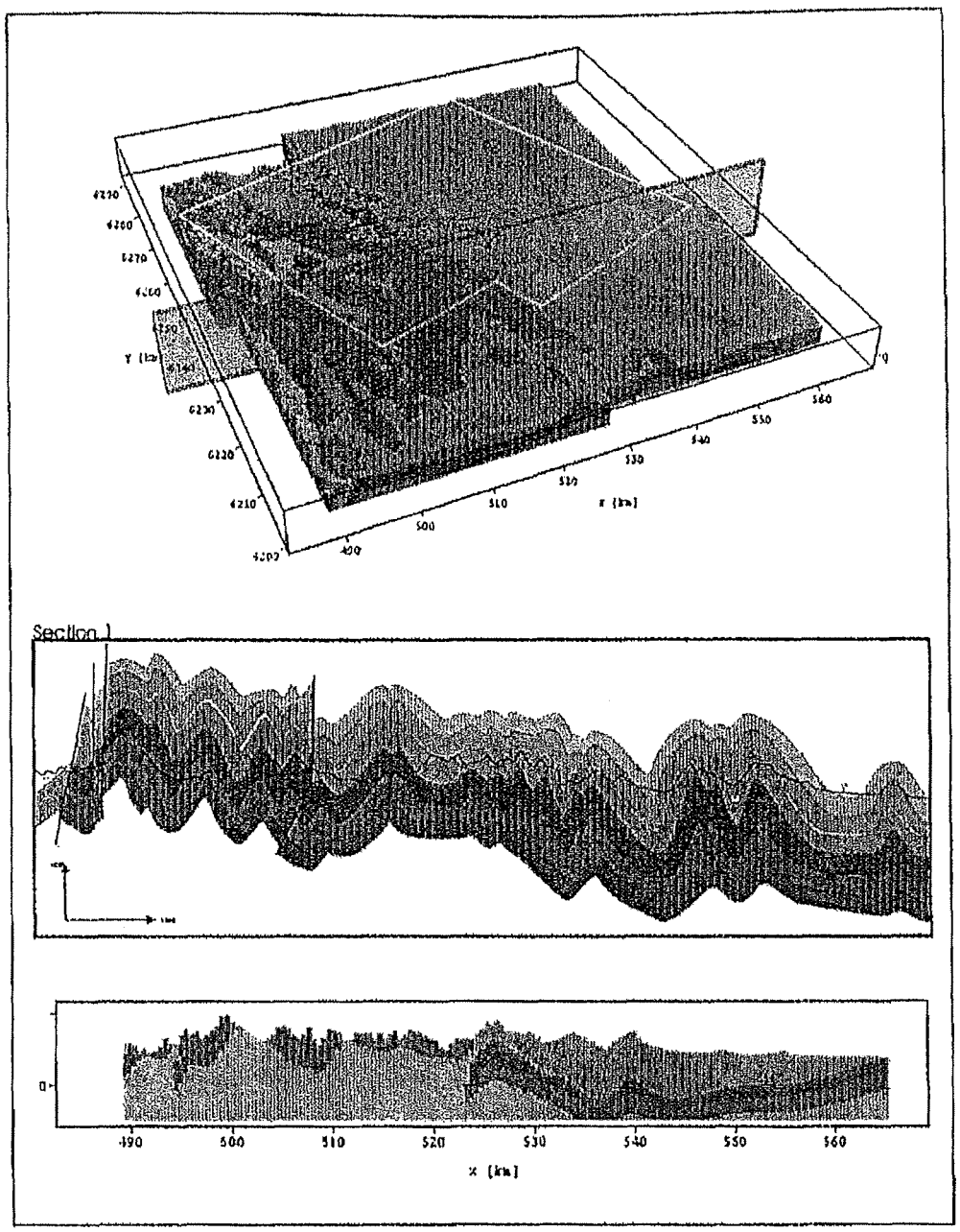
FIG. 8 is the resultant shallow earth model (SEM) of the area of FIG. 3 together with a balanced cross-section and section through the (SEM)

With all the information gathered, the next stage of building the SEM is to derive the resultant surfaces prior to removal from the full earth model. A simple gridding operation applied to the surfaces would not correctly honour the topographic variations and, by using GIS (geographic information systems) analysis methods, the LiDAR data is used to generate dip and plunge information. The resultant surfaces are then assigned their respective density variations and the gradient response of each key interface forward calculated and removed form the total Earth model. The remaining density distribution following subtraction would now represent the density variations arising from the Debolt level. FIG. 8 shows the resultant SEM, with each layer clearly displayed.

Figure 9:
FIG. 9 shows the surface location and geology for a well.
Figure 10:
FIG. 10 shows the vector $G_{zz}$ highlighting the structural variations at the Debolt level for the sub-area shown on FIG. 9.

FIGS. 9 and 10 show how the new methodology described above could add additional understanding to previously explored targets. As shown in FIG. 9, a well was drilled based on the surface anticline and 2D seismic data that appeared to image the main structure. Despite chasing borehole dip data to sidetrack towards the anticline axial plane, the well was too far off structure and therefore abandoned. FIG. 10 shows the sub-surface map generated according to the invention, i.e. with the SEM data removed. FIG. 10 shows that the actual structural target is positioned east of the surface anticline. This is because the Debolt anticline sits beneath a detachment surface located within younger Triassic strata. Consequently, the seismic drilling line and placement for the well only clipped the northern limit of a wrench-fault bounded anticline. Applying the methodology described above, the well location would probably have been changed.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A computer-implemented method of processing a set of measurements of geophysical data including at least measured potential field data from a potential field survey of a surveyed region of the earth to provide a representation of the geology of said surveyed region with a data processing system, including a processor, the method comprising:

using said processor, generating a shallow earth model of said surveyed region by fitting data predicted by said shallow earth model to said measured potential field data for a pre-defined bandwidth of the measured potential field data by applying $$\min\{L[\text{filter}(\text{pred}(x)-m)]\}$$

where filter is a spatial filter to remove frequencies outside a range of interest, L is a fit measure, pred(x) are the data predicted by the shallow earth model given a set of parameters x, and m represents the set of measurements;

predicting full range potential field data for all measured frequencies using said generated shallow earth model;

comparing said predicted full range potential field data to said measured potential field data to provide full range residual data representing a difference between the predicted full range potential field data and the measured potential field data, and interpreting said full range residual data to provide a representation of said geology of said surveyed region.

2. A method according to claim 1, comprising generating said shallow earth model for high frequencies.

3. A method according to claim 1, wherein said shallow earth model comprises topography and depth to bedrock.

4. A method according to claim 1, wherein said shallow earth model has a set of parameters consisting of densities.

5. A method according to claim 1, wherein the measured potential field data comprises gravity gradiometer data.

6. A computer-implemented method of processing a set of measurements of geophysical data including at least measured gravity gradiometer data from a potential field survey of a surveyed region of the earth to provide a representation of the underlying geology of said surveyed region with a data processing system, including a processor, the method comprising:
    using said processor, processing said gravity gradiometer data to generate a shallow earth model,
    removing data predicted by said shallow earth model from said measured gravity gradiometer data to leave residual data by fitting data predicted by said shallow earth model to said measured gravity gradiometer data for a pre-defined bandwidth of the measured gravity gradiometer data by applying $$\min\{L[\text{filter}(\text{pred}(x)-m)]\}$$

where filter is a spatial filter to remove frequencies outside a range of interest, L is a fit measure, pred(x) are the data predicted by the shallow earth model given a set of parameters x, and m represents the set of measurements;
    processing said residual data to generate a model of sub-surface geology by predicting full range potential field data for all measured frequencies using said generated shallow-earth model and comparing said predicted full range potential field data to said measured gravity gradiometer data to provide full range residual data representing a difference between the predicted full range potential field data and the measured gravity gradiometer data, and
    generating a representation of said underlying geology of said surveyed region using at least one of said shallow earth model and said sub-surface geology model.

7. A method according to claim 6, comprising generating the shallow earth model by fitting data predicted by said shallow earth model to said measured gravity gradiometer data for high frequencies.

8. A method of prospecting for oil or a mineral from the earth, the method comprising conducting a potential field survey of a region, using the method of claim 1 to process data from said potential field survey to generate a three-dimensional representation of the underlying geology of the surveyed region, and locating said oil or mineral using said three-dimensional representation of said underlying geology.

9. A non-transitory computer-readable carrier carrying processor control code which when executed by a computer causes said computer to:
    generate a shallow earth model of a surveyed region by fitting data predicted by said shallow earth model to a set of measurements of geophysical data including at least measured potential field data for a pre-defined bandwidth of the measured potential field data by applying $$\min\{L[\text{filter}(\text{pred}(x)-m)]\}$$

where filter is a spatial filter to remove frequencies outside a range of interest, L is a fit measure, pred(x) are the data predicted by the shallow earth model given a set of parameters x, and m represents the set of measurements;
    predict full range potential field data for all measured frequencies using said generated shallow earth model;
    compare said predicted full range potential field data to said measured potential field data to provide full range residual data representing a difference between the predicted full range potential field data and the measured potential field data; and
    interpret said full range residual data to provide a representation of the underlying geology of said surveyed region.

10. A geological data processing system for processing a set of measurements of geophysical data including at least measured potential field data from a potential field survey of a surveyed region of the earth to provide a representation of the underlying geology of said surveyed region, the system comprising:
    data memory for storing said potential field data and data for representing said underlying geology;
    program memory storing processor control code; and
    a processor coupled to said data memory and to said program memory whereby said processor is configured to:
    generate a shallow earth model of said surveyed region by fitting data predicted by said shallow earth model to said stored potential field data for a pre-defined bandwidth of said stored potential field data by applying $$\min\{L[\text{filter}(\text{pred}(x)-m)]\}$$

where filter is a spatial filter to remove frequencies outside a range of interest, L is a fit measure, pred(x) are the data predicted by the shallow earth model given a set of parameters x, and m represents the set of measurements;
    predict full range potential field data for all measured frequencies using said generated shallow earth model;
    compare said predicted full range potential field data to said stored potential field data to provide full range residual data representing a difference between the predicted full range potential field data and the stored potential field data; and
    interpret said full range residual data to provide a representation of said geology of said surveyed region.

* * * * *